Figure 4:
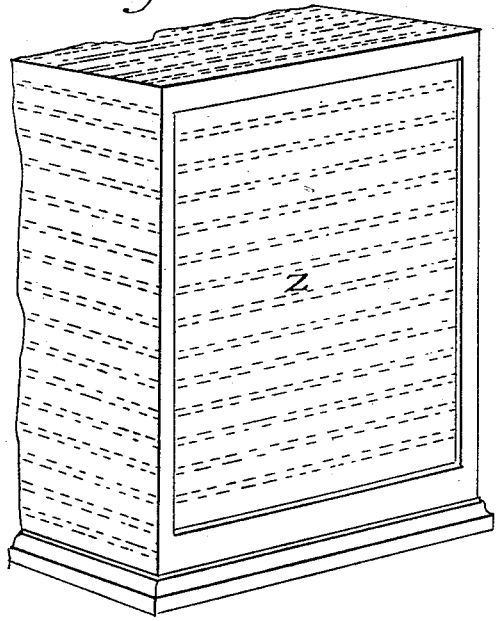

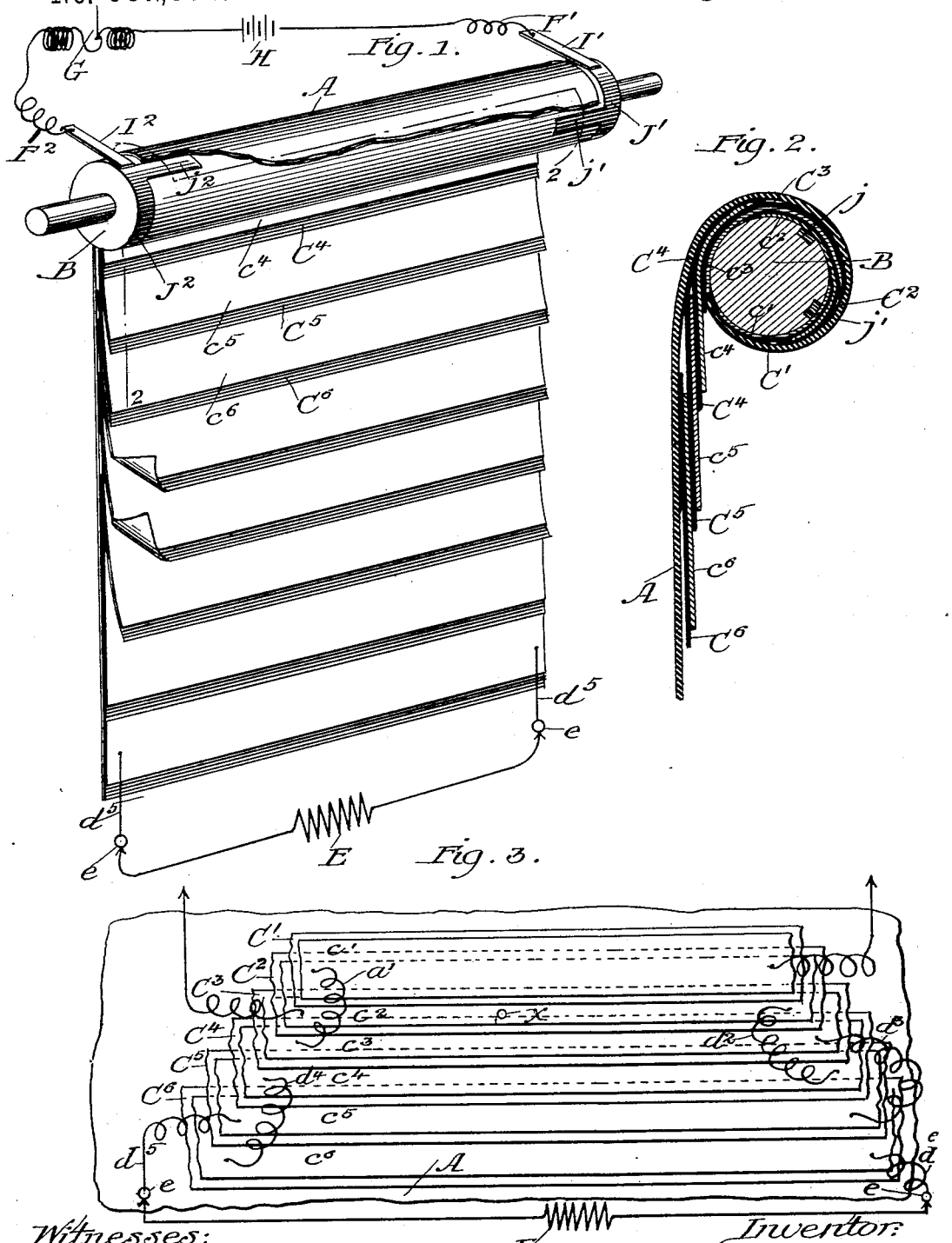

(No Model.) 3 Sheets—Sheet 2.

C. COLEMAN.
BURGLAR ALARM.

No. 587,931. Patented Aug. 10, 1897.

Witnesses:
Frank S. Blanchard
J. Cross

Inventor:
Clyde Coleman
By Gidley & Hopkins
Attorneys.

THE NORRIS PETERS CO., PHOTO-LITHO., WASHINGTON, D. C.

(No Model.) 3 Sheets—Sheet 3.

C. COLEMAN.
BURGLAR ALARM.

No. 587,931. Patented Aug. 10, 1897.

Witnesses:
Frank S. Blanchard
J. Cross

Inventor:
Clyde Coleman
By Gridley & Hopkins
Attorneys.

UNITED STATES PATENT OFFICE.

CLYDE COLEMAN, OF CHICAGO, ILLINOIS, ASSIGNOR OF TWO-THIRDS TO ALBERT L. DEANE AND JAMES W. DONNELL, OF SAME PLACE.

BURGLAR-ALARM.

SPECIFICATION forming part of Letters Patent No. 587,931, dated August 10, 1897.

Application filed January 11, 1897. Serial No. 618,776. (No model.)

*To all whom it may concern:*

Be it known that I, CLYDE COLEMAN, a citizen of the United States, residing at Chicago, in the county of Cook and State of Illinois, have invented certain new and useful Improvements in Electrical Barriers for Use in Burglar-Alarm and other Electrical Systems, of which the following is a specification.

The present invention relates to an electrical barrier which is so constructed that if penetrated by a metallic instrument or if an opening of any considerable size be made through it a signal will be given. The giving of the signal in the one instance is due to the fact that the metallic instrument penetrating the barrier electrically connects portions of it, which though immediately adjacent in a physical sense are distant in an electrical sense and possess a difference of potential, so that upon being thus electrically connected the portion of the barrier which is between the points thus connected and whatever instrument or instruments may be included in it is short-circuited, and this short-circuiting causes a variation in the current, which variation is made use of for signaling purposes. The giving of the signal in the other instance is due to the fact that the barrier is included in a closed circuit and is so constructed that an opening of any considerable size cannot be made through it without breaking this circuit, with the result already described. Barriers of this class are quite extensively used in burglar-alarm systems of modern construction. In some instances the barrier is incorporated in the walls, doors, or other parts of the structure to be guarded; in some instances it is incorporated in the walls of a cabinet which surrounds the structure to be guarded and which may itself be regarded as the structure to be guarded, and in some instances it is incorporated in a curtain arranged so that it may be drawn down in front of the door of a vault, or to close a doorway, a window, or other opening.

The present invention is not limited to any particular use for the barrier embodying it, but, on the contrary, I reserve to myself the exclusive right to use it in any or all of the ways above described, or in any other way in which it may be found to be useful. It is, however, especially adapted for use on flexible curtains, and I shall therefore in this application claim specifically those features of the invention which make it so admirably adapted for this particular purpose, albeit in its broadest aspect the invention is not limited thereto.

The invention consists in the features of novelty that are hereinafter described with reference to the accompanying drawings, which are made a part of this specification, and in which—

Figure 6:
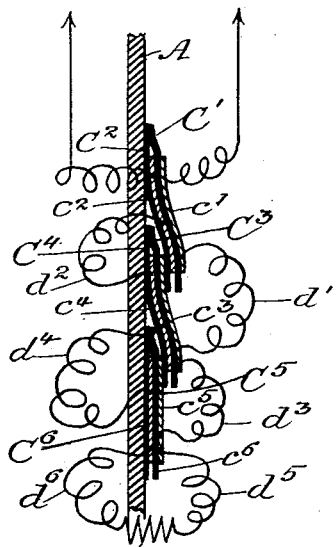
Figure 5:
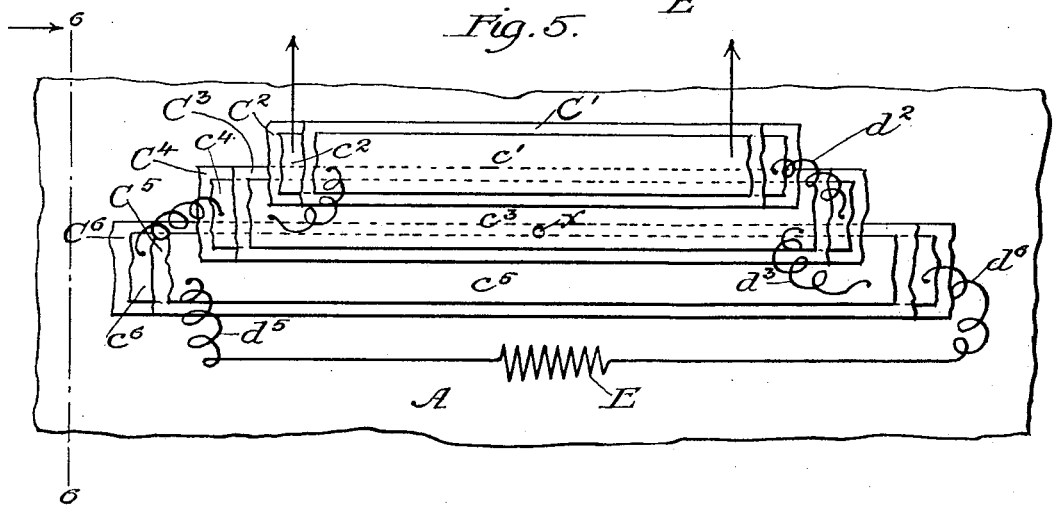

Figure 1 is a perspective view of a curtain provided with a barrier embodying the invention and a diagrammatic representation of an alarm system in which the barrier is included. Fig. 2 is a vertical section thereof in the offset planes indicated by the lines 2 2, Fig. 1. Fig. 3 is a diagrammatic representation of a fragment of a barrier embodying the invention. Fig. 4 is a perspective view of a cabinet or other structure equipped with a barrier embodying the invention. Fig. 5 is a diagrammatic representation of a fragment of a barrier differing somewhat from that shown in Figs. 1, 2, and 3, but still embodying some features of the invention. Fig. 6 is a section thereof on the line 6 6, Fig. 5, looking in the direction of the arrow. Figs. 7 to 13, inclusive, are diagrammatic representations of as many different ways in which a barrier embodying the invention may be included in an electrical system.

A represents a backing, the character of which will depend upon the use to be made of the barrier of which it forms the foundation. If the barrier is to be arranged upon a curtain, the curtain will constitute the backing and, being flexible, may be wound upon a roller, such as shown at B in Fig. 1. In such case it may be made of leather, or of woven fabric, or of any other suitable flexible material. Where the barrier is to be incorporated in a wall or partition, it may be constructed upon a flexible backing, the same as when it is to be arranged upon a roller, and this backing may be arranged upon the wall, either on the inside or the outside thereof, or the wall itself may constitute the backing.

It should be understood that where the contrary is not expressed or necessarily inferred the term "backing" as used in this specification includes either a rigid or a flexible backing.

The barrier proper consists of a number of strips or leaves $C'$ $C^2$ $C^3$, &c., of some insulating material, to each of which is secured one or more conducting-strips $c'$ $c^2$ $c^3$, &c. Preferably the insulating-strips are flexible, and to this end are made of cotton cloth or other woven fabric treated with shellac or some other suitable material for increasing its insulating properties. Preferably the insulating-strips are disposed parallel with each other and are secured to the backing upon lines that are parallel with their edges, the preferred arrangement being that in which each of them is secured to the backing at only one of its edges and each overlaps the next in succession shingle fashion. Where the barrier is to be arranged upon a curtain mounted upon a roller, the insulating-strips are disposed with their edges parallel with the roller and are secured to the curtain at their edges which are nearest the roller. Preferably each of the conducting-strips is made of a strip of tin-foil or other thin sheet material that is a good conductor of electricity, but it may consist of one or more suitably-arranged wires, or a strip of fabric woven in whole or in part of wire, or some other suitable conducting material. Tin-foil is, however, preferred.

In the preferred arrangement a single conducting-strip is secured to the outside of each of the insulating-strips, and the conducting-strips are disposed so that each overlaps the next in succession shingle fashion and so that each extends at least to the margin of the second in succession, or, in other words, so that the alternate strips alone will completely cover the entire area to be covered by the barrier, as shown more clearly in Figs. 1, 2, and 3. When so arranged, the alternate conducting-strips $c'$ $c^3$ $c^5$, &c., are electrically connected in series by wires $d'$ $d^3$ $d^5$, &c., and the intervening alternate conducting-strips $c^2$ $c^4$ $c^6$, &c., are electrically connected in series by wires $d^2$ $d^4$ $d^6$, &c., and the terminals of the last strips $c^5$ $c^6$ of the two series are electrically connected with the opposite ends of a resistance E, the terminals of the first strips $c'$ $c^2$ of the two series being electrically connected with the opposite sides $F'$ $F^2$ of a circuit by which the alarm or signaling device is controlled.

The present invention is not limited to a signaling device of any particular construction. In the drawings I have indicated at G an instrument which may be a galvanometer or a balanced relay or any other electrical appliance which will be disturbed or influenced by a variation in the current passing through the circuit $F'$ $F^2$ from the battery H, and which when so disturbed or influenced will cause either a visible or an audible signal to be given, all of such instruments being comprehended by the term "meter," as herein used.

In Figs. 5 and 6 the insulating-strips are shown as being arranged in pairs, one directly over the other, and so are the conducting-strips. That is to say, the insulating-strips $C'$ $C^2$ are arranged in a pair, one above the other, edge to edge, the insulating-strips $C^3$ $C^4$ are arranged in a pair, one above the other, edge to edge, and so on, and the several pairs are so disposed that each overlaps the next in succession shingle fashion. The conducting-strips are arranged in the same manner, so that when viewed edgewise or in section, as in Fig. 6, the conducting-strips $c'$ $c^2$ will be seen to be superposed and to be insulated by the strip $C'$, the conducting-strip $c^2$ being insulated from the strip $c^3$ by the insulating-strip $C^2$, and so on as to the other conducting-strips. In this arrangement the two conducting-strips $c'$ $c^2$ may be considered as both secured to the insulating-strip $C'$, one upon each side of it, or they may be considered as being secured to the strips $C'$ and $C^2$, respectively. The conducting-strips when arranged as in Figs. 5 and 6 may be electrically connected in precisely the same manner as when arranged in Fig. 3, and are so shown, the connecting-wires in both instances being indicated by similar letters of reference.

It will be seen with both of these arrangements that at every point within the entire area included by the barrier the barrier is made up of superposed conducting-strips separated by insulating-strips and so arranged in an electrical circuit or circuits that the superposed conducting-strips at any given point possess a difference of potential. With this arrangement, if electrically connected at any given point by a metallic instrument used for the purpose of penetrating them, the current will follow the instrument from one of them to the other. For example, let it be supposed that the barrier is penetrated by a metallic instrument at the point marked $x$, either in Fig. 3 or Fig. 5. The instrument will electrically connect the conducting-strips $c^3$ and $c^4$, so that the current, instead of passing from $c^3$ through the wire $d^3$ to $c^5$ and thence to and through the resistance E, will pass from $c^3$ to $c^4$, (through the instrument,) and from $c^4$ through wire $d^2$ to $c^2$, and thence through the circuit $F^2$ to the meter, causing the latter to be disturbed; or let it be supposed that an opening is made through the barrier large enough to admit the hand. This will sever one or more of the conducting-strips, (which are preferably about two inches wide,) and thereby break the circuit and entirely cut off the current, causing a disturbance of the meter.

In Fig. 4 I have shown a structure which may be called the "guarded" structure, which term is intended to include a building or a part of a building or a safe or a cabinet inclosing a safe or any other structure to which it is desired to prevent a surreptitious entrance. In this figure I have by dotted lines indicated the application of the improved barrier to the top and one side of the guarded structure and to a curtain Z, which closes the opening through which entrance to the structure is had. Preferably when arranged upon a curtain the curtain is mounted upon a roller having conducting-rings $J'$ $J^2$, which are insulated from each other and provided with contacts $j'$ $j^2$, which have electrical contact with the strips $c'$ $c^2$, respectively, and electrical connection between the circuit $F'$ $F^2$ and the rings $J'$ $J^2$ is made by brushes $I'$ $I^2$ of any suitable construction. Preferably also the curtain is so arranged with relation to contacts $e$ that when the curtain is down the circuit will be closed at these contacts, but when the curtain is elevated even slightly the circuit will open at these contacts and cause an alarm to be given. This may be accomplished by any of the well-known arrangements. Again resistance E may be carried by the curtain or it may be arranged in a stationary circuit which is automatically included in the main circuit when the curtain is lowered.

I desire to have it understood that the invention is not limited to the character of the system in which the improved barrier is incorporated or to the character or disposition of the appliances used for maintaining a difference of potential in the superposed conducting-strips, albeit I prefer the arrangement shown in Figs. 1 to 6, inclusive, where equal numbers of the conducting-strips are arranged in series upon opposite sides of the resistance and all included in circuit with the meter and battery. Other systems are shown diagrammatically in Figs. 7 to 12, inclusive, and since these figures will be readily understood by those skilled in the art when considered in connection with the foregoing description and Figs. 1 to 6, inclusive, only a brief description of them will be given. In all of the figures of the drawings, including these diagrams, similar parts are indicated by similar letters of reference, and in considering the diagrams it is to be understood that the conducting-strips are to be superposed in the manner already described, the reference-letters placed upon them being sufficient indication of the order in which they are arranged, the order being the same as in the preceding figures.

Figure 7:
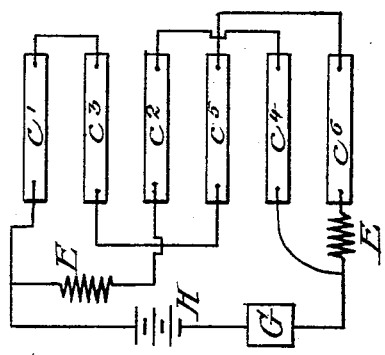

In Fig. 7 the conducting-strips are arranged in two circuits, each having a resistance E, between which normally the current divides, so that upon electrically connecting the superposed conducting-strips either one or both of the resistances will be short-circuited.

Figure 8:
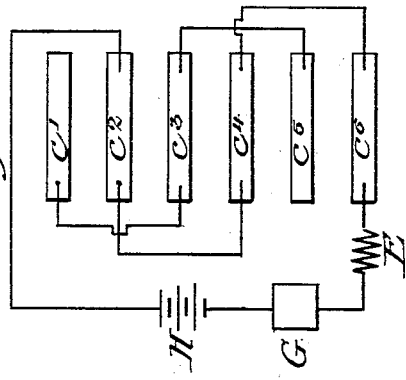

In Fig. 8 some of the conducting-strips are arranged in series in a circuit which includes the resistance and the others are arranged in series in an interrupted branch of this circuit, one conducting-strip of each pair being arranged in each of these two circuits.

Figure 9:
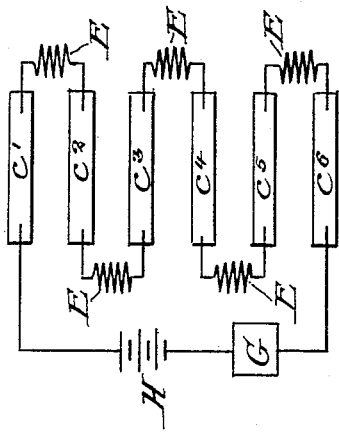
Figure 12:
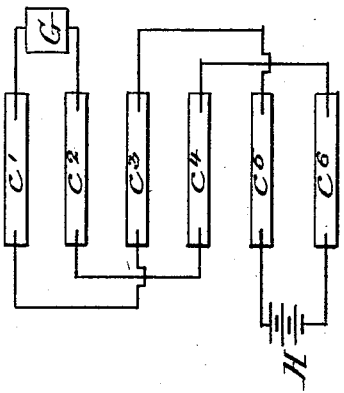

In Fig. 9 all of the conducting-strips are arranged in series and a resistance E is arranged in series between each of the conducting-strips and the next.

Figure 10:
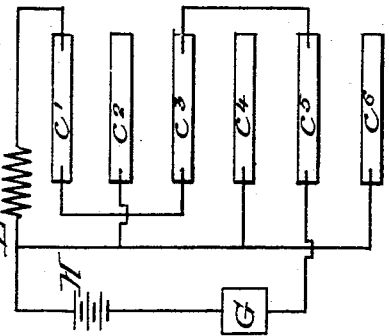

In Fig. 10 some of the conducting-strips are arranged in series in a closed circuit, including the resistance, and the others are arranged in multiple in an interrupted branch of this circuit, one conducting-strip of each pair being arranged in each of these circuits.

Figure 11:
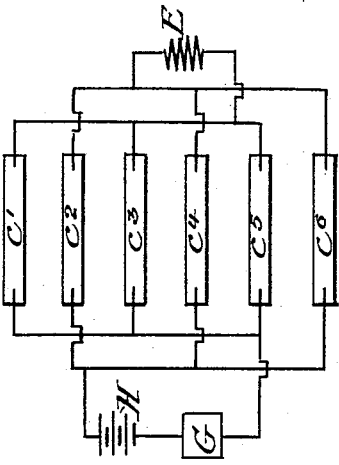

In Fig. 11 some of the conducting-strips are arranged in multiple arc in a circuit which is electrically connected with one end of the resistance and the others are arranged in multiple arc in a closed circuit which is electrically connected with the other end of the resistance, one strip of each pair being arranged in each of these circuits.

In all these several arrangements one or more "resistances," technically so called, are relied upon for getting an effective difference of potential in superposed conducting-strips; but I desire to have it understood that the invention is not limited thereto, but, on the contrary, includes any other device or appliance that will produce this result. One way of producing it without the use of a "resistance," strictly so called, is to use a battery, and in Fig. 12 I have shown a battery substituted for the resistance in the arrangement shown in Figs. 1 to 6, inclusive. In like manner a battery may be substituted for the resistance or resistances in any of the arrangements shown in Figs. 7 to 11, inclusive.

Having thus described my invention, the following is what I claim as new therein and desire to secure by Letters Patent:

1. In an electrical barrier, the combination with a plurality of parallel insulating-strips, of a plurality of parallel conducting-strips secured to the insulating-strips and arranged so as to overlap, substantially as set forth.

2. In an electrical barrier, the combination with a plurality of parallel insulating-strips arranged to overlap, of a plurality of parallel conducting-strips secured to the insulating-strips, substantially as set forth.

3. In an electrical barrier, the combination with a plurality of parallel insulating-strips arranged to overlap, of a plurality of parallel conducting-strips secured to the insulating-strips and arranged to overlap, substantially as set forth.

4. In an electrical barrier, the combination with a suitable backing, of a plurality of parallel insulating-strips each secured at one of its edges to said backing, said insulating-strips being arranged to overlap, and a plurality of parallel conducting-strips secured to the insulating-strips, substantially as set forth.

5. In an electrical barrier, the combination with a suitable backing, of a plurality of parallel insulating-strips each secured at one of its edges to said backing, and a plurality of parallel conducting-strips secured to the insulating-strips, said strips being arranged to overlap, shingle fashion, substantially as set forth.

6. In an electrical barrier, the combination with a backing, of a plurality of parallel insulating-strips secured thereto, a plurality of superposed parallel conducting-strips, insulated from each other by the insulating-strips, and means for maintaining a difference of potential in the parallel superposed conducting-strips, substantially as set forth.

7. In an electrical barrier, the combination of a flexible backing, a plurality of parallel insulating-strips secured to the backing so as to be free at their edges, and a plurality of parallel conducting-strips secured to the insulating-strips, substantially as set forth.

8. In an electrical barrier, the combination of a flexible backing, a plurality of flexible parallel insulating-strips secured thereto, a plurality of parallel superposed conducting-strips insulated from each other by the insulating-strips, and means for maintaining a difference of potential in the parallel superposed conducting-strips, substantially as set forth.

9. In an electrical barrier, the combination of a flexible backing, a roller upon which it is mounted, a plurality of flexible insulating-strips secured to the backing and disposed with their edges parallel with the roller, and a plurality of conducting-strips secured to the insulating-strips, substantially as set forth.

10. In an electrical barrier, the combination with a flexible backing and a roller upon which it is mounted, of a plurality of insulating-strips disposed parallel with the roller and secured to the backing upon lines that are parallel with their edges, and a plurality of conducting-strips secured to the insulating-strips, substantially as set forth.

11. In an electrical barrier, the combination with a flexible backing and a roller upon which it is mounted, of a plurality of insulating-strips disposed parallel with the roller and each having its edge adjacent to the roller secured to the backing, and a plurality of conducting-strips secured to the insulating-strips, substantially as set forth.

12. In an electrical barrier, the combination with a flexible backing and a roller upon which it is mounted, of a plurality of insulating-strips disposed parallel with the roller and having their edges adjacent to the roller secured to the backing, said insulating-strips being arranged to overlap, and a plurality of conducting-strips secured to the insulating-strips and arranged to overlap, substantially as set forth.

13. In an electrical barrier, the combination with a flexible backing and a roller upon which it is mounted, of a plurality of insulating-strips disposed parallel with the roller and having their edges which are adjacent to the roller secured to the backing, said insulating-strips being arranged to overlap shingle fashion, a plurality of superposed conducting-strips secured to and insulated from each other by the insulating-strips, and means for maintaining a difference of potential in the superposed conducting-strips, substantially as set forth.

CLYDE COLEMAN.

Witnesses:
L. M. HOPKINS,
I. CROSS.